United States Patent

[11] 3,627,330

[72] Inventor Panayotis C. Dimitracopoulos
3435 Drummond St. Suite 26, Montreal, Quebec, Canada

[21] Appl. No. 872,643
[22] Filed Oct. 30, 1969
[45] Patented Dec. 14, 1971

[54] PREGROOVED MAGNETIC TRACKS
5 Claims, 10 Drawing Figs.

[52] U.S. Cl. .......... 274/41.4
[51] Int. Cl. .......... G11b 3/72
[50] Field of Search .......... 274/41.4, 42, 46, 38

[56] References Cited

FOREIGN PATENTS

| | | | |
|---|---|---|---|
| 932,274 | 8/1955 | Germany | 274/38 |
| 909,742 | 10/1962 | Great Britain | 274/41.4 |
| 15,435 | 8/1963 | Japan | 274/41.4 |

*Primary Examiner*—Harry N. Haroian

ABSTRACT: A form of grooved track for pregrooved magnetic records, said records having spaced-apart raised walls defining between them the surface area of the magnetic track, and there being a recessed groove, or "gutter," between an edge of the track and the adjoining wall, this arrangement permitting improved seating of the pole shoe of an electromagnetic transducer on the magnetic track of the record.

DIAGRAMMATIC ILLUSTRATION

*INVENTOR*

P. C. DIMITRACOPOULOS

PREGROOVED MAGNETIC TRACKS

FIELD OF INVENTION

This invention relates to special forms of pregrooved magnetic tracks employed on magnetic records for the recording and reproduction of audio, impulse and signal information.

DESCRIPTION OF PRIOR ART

Magnetic tape, as used in tape recorders, computer and automatic control apparatus and devices, is probably the best known medium for the magnetic recording of audio and impulse information. It consists of a plastic or paper ribbon, containing magnetic oxide, or a magnetizable substance, or more commonly, coated with a thin coating or layer of magnetic oxide or magnetizable substance. While the ribbon or "tape" form is the most widely used today, other forms, such as sheets, belts, discs, cylinders, etc. are also well known in the art.

In order to record or reproduce information from magnetic tape and the other forms above-mentioned, electromagnetic transducers are used, and this requires an almost perfect contact between the "tip," or as it is more commonly known the "shoe," the electromagnetic transducers and the magnetic material. In order to guide this shoe along a desired, predetermined, path or track, it is often necessary to provide guiding grooves, or guiding "walls," on the surface of the magnetic material, so that the shoe of the transducer may ride on the magnetic material, guided by these walls or grooves.

OBJECTS OF THE INVENTION

It is the object of the present invention to improve the "-seating" of the tip, or shoe, of electromagnetic transducers in pregrooved magnetic tracks, by providing additional small longitudinal grooves, recesses, or "gutters," between the magnetic tracks themselves and the guiding walls adjacent thereto.

SUMMARY

In order to ensure the best possible contact between the shoe of an electromagnetic transducer and the pregrooved magnetic track in which it rides, an additional recessed groove is added between the surface of the track and its adjoining wall.

DESCRIPTION OF THE PREFERRED EMBODIMENT

The invention will be described herein by reference to certain presently preferred specific embodiments thereof, however, it will be understood by those skilled in the art that the principles of the invention can be carried out by specifically different physical devices, and that in using words of limited meaning for the better understanding of the particulars of the forms chosen for description and illustration, it is not intended to exclude variations of those details which properly fall within the scope of the invention in its broader aspects.

Figure 1:
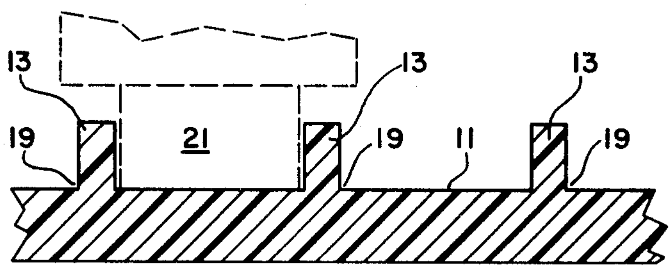
FIG. 1 is an enlarged, diagrammatic, fragmentary, cross-sectional illustration of a pregrooved magnetic record.
Figure 2:
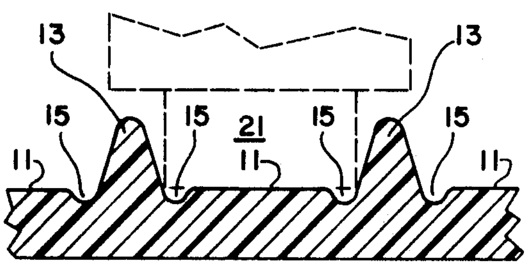
FIGS. 2, 3, 4 and 5 are enlarged, cross-sectional, fragmentary illustrations of pregrooved magnetic records, showing various shapes of track according to the invention.
Figure 2A:
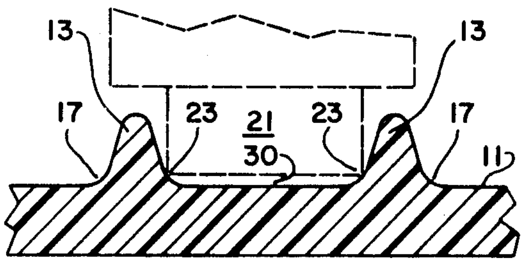
FIG 2A (PRIOR ART)
FIGS. 2A, 3A, 4A and 5A are enlarged, cross-sectional, fragmentary illustrations of pregrooved magnetic records, showing shapes of tracks according to the prior art, FIG. 2A being the equivalent prior art of FIG. 2, FIG. 3A of FIG. 3, etc.

FIG. 1 is a fragmentary, enlarged diagrammatic illustration of a typical cross section of a magnetizable material formed with pregrooved tracks 11, separated by guiding "walls" 13. The shoe 21 of an electromagnetic transducer rides on track 11, guided by two walls 13.

It is evident that in order to ensure best performance, the cross section of the surface of the track 11 must mate perfectly with the cross section of the shoe 21, i.e., the track 11 must be as flat a surface as it is possible to manufacture.

Pregrooved magnetic tracks are usually made by molding or pressing techniques, and thus the diagrammatic cross section of FIG. 1 is very difficult, if not impossible, to produce, Instead, cross sections as illustrated in FIGS. 2A, 3A, 4A and 5A are more common. In other words, in the molding or pressing process it is difficult to obtain the sharp corners 19 of FIG. 1, between the track 11 and the walls 13.

Instead, uneven, curved or sloping, surfaces are usually obtained, as typically illustrated by numerals 17 in FIGS. 2A through 5A. It is now evident that the shoe 21, will not necessarily ride on the surface of the track 11, but may ride on these curved or sloping surfaces, which means that between the shoe 21 and the track 11, a void may exist, this void being designated by numeral 30 and illustrated in somewhat exaggerated scale in FIGS. 2A.

SInce the curve or slope 17 will vary from point to point along the length of the magnetic track, it will force the shoe 21 to ride at constantly varying distances away from the magnetic surface 11. If the shoe 21 is very hard, it is evident that it may tear away the surface of the magnetic material or at least it may scrape-off magnetic oxide from the curved surfaces 17. If the shoe 21 is soft, then the shoe will wear at the corners. In practice, both processes occur. Microscopic elements of magnetic oxide are scraped-off from the slope 17, and some become embedded in the shoe 21. Magnetic oxide being hard and abrasive, will then scrape-off more oxide, which, in turn will erode the corner 23 of the shoe, and once this process starts it will continue at an accelerated rate. Obviously both the magnetic tracks and the shoes of the transducers will suffer.

The inventor of the present invention has been actively engaged in magnetic recording and reproduction for over 12 years and is the holder of several patents related to this field, most of which are now the object of commercial manufacture. He was therefore exposed to the above-described problem, and during the early part of 1962 it occurred to him that some kind of relief should be highly desirable at the interface between the walls 13 the the track surfaces 11 of pregrooved magnetic tracks.

He has, therefore, engaged in a series of experiments in order to devise and determine shapes of pregrooved tracks and develop the methods, tools and equipment to produce them.

The solution, which he has experimentally verified and proved by producing such pregrooved magnetic tracks, is to provide a relief, in the form of an additional small groove (or "gutter") at the merging area between the track and the wall. This relief is designated by numeral 15 in the FIGS. 2 through 6. It is now evident that by providing this relief, the edges of the shoe 21 will more or less ride on nothing but air, while the main surface of the shoe 21 will always firmly contact the track 11. This improves the performance in many ways, to name a few:

The information on the track is recorded and reproduced in a more faithful manner.

Less pressure is required between the transducer and the track all other parameters being equal.

Wear of the magnetic track is minimized as is the wear of the transducer's shoe.

The shapes of the "walls" separating pregrooved magnetic tracks may, of course, vary. As a matter of fact, not only the shapes may vary, but also the height of the walls, the slopes of their surfaces, the radii of their tips, etc., etc. This holds equally true for the width of the tracks themselves. The present invention is, therefore applicable in all cases, and only as an example a few shapes have been illustrated in the accompanying FIGS. and, as it can be seen, it is nearly always possible to provide the above-described "recess" or "relief" grooves 15 between the tracks and the separating walls, and as above stated, it has been experimentally proved beyond doubt that these extra secondary grooves 15 are of tremendously great practical importance.

Figure 6:
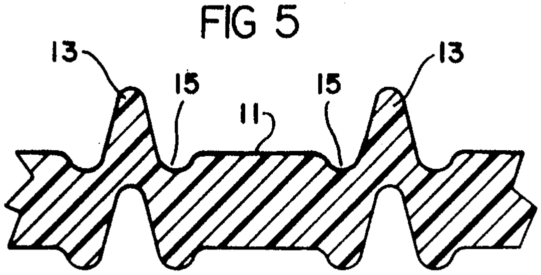
FIG. 6 is still another cross-sectional, fragmentary, enlarged illustration of a pregrooved magnetic record according to the invention.

FIG. 6 illustrates a fragmentary, cross-sectional view of a pregrooved magnetic record of particular practical importance. The upper (or working) surface is in all respects similar to the upper surface of the record illustrated in FIGS. 2, but the lower surface closely follows the shape and contours of the upper surface, for example, directly underneath the separating wall there is a corresponding groove or depression, while under the recess 15 there is a corresponding raised wall.

Figure 3:
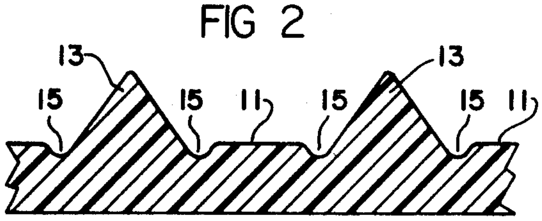
Figure 3A:
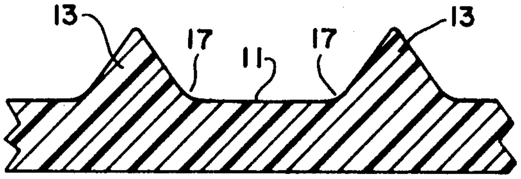
FIG 3A (PRIOR ART)
Figure 4:
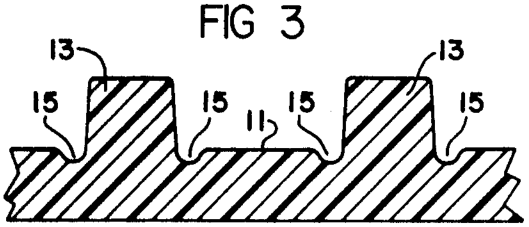
Figure 4A:
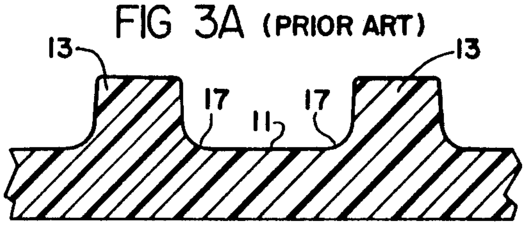
FIG 4A (PRIOR ART)
Figure 5:
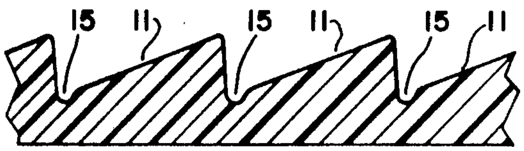
Figure 5A:
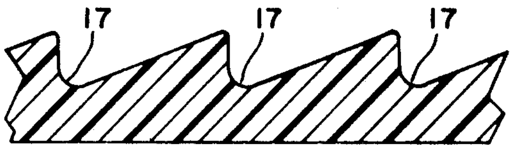
FIG 5A (PRIOR ART)

In a similar fashion the records of FIGS. 3, 4 and 5 could have their lower surfaces substantially paralleling the contours of their upper surfaces.

The importance of records of the type of FIG. 6 is that they may be manufactured by pressing a thin magnetizable sheet between a pair of enantiomorphic, allochiral, matching dies, as described in U.S. Pat. No. 3,502,761, by the same inventor, this process permitting the manufacturing of pregrooved magnetic records of small or very small thickness, which in turn have great importance in that they can assure a nearly perfect contact with the shoe of a magnetic transducer, because elemental areas of their track may "float" and adjust themselves to the lower surface of the shoe of the transducer. A further practical importance of records of this type is that their pressing between a pair of enantiomorphic, allochiral, matching dies, is a very reliable, inexpensive method lending itself to the mass-production of such magnetic records of the highest quality.

The above-described form of pregrooved magnetic tracks may be utilized in records of various shapes and forms, for example, flat magnetic discs having spiral tracks, or magnetic strips, belts, ribbons, cylinders, etc., etc.

The terms "pregrooved" and "pregrooving" are intended to include not only the actual grooving as used in the sense of engraving, but also the pressing of the desired shapes as well as the molding or other methods of forming the desired shapes of the above-described magnetic sound tracks.

It has been stated that the records or their surface may contain, or may be coated with, magnetic oxide, since magnetic oxides are the most commonly employed substances today. But the term "magnetic oxide" is intended to include any magnetic or magnetizable element, material, substance or composition that may be used in magnetic records of the type above-described.

While it may appear more practical to make the above-cited magnetic records with a uniform coating or layer of magnetizable substance, or this magnetizable substance may be contained within the material of the record, the arrangement of the present invention is intended to include records having a magnetic or magnetizable substance in or on parts only of the record or record surface, for example, on the magnetic track itself only or on desired portions thereof.

Therefore, while a number of specific embodiments of the invention have been disclosed, it will be understood that various modifications and variations, within the spirit of the invention, are possible.

What is claimed is:

1. A thin pregrooved magnetic record, said record formed with spaced-apart raised walls defining between them the surface area of a magnetic track, and there being a longitudinal recess groove, in the form of a gutter, at the merging area between said surface area and each adjoining wall, the thickness of said record being quite small, specifically being of the same order of magnitude as the width of said magnetic track, the small thickness of said record in combination with the configuration of said track said walls and said recess grooves resulting in a flexibility between adjacent elemental areas of said track, thus allowing said elemental areas of said track to float and move and adjust themselves against the working tip of an electromagnetic transducer, assuring an improved contact between said elemental areas and said working tip of said transducer, when said transducer moves along and scans said track of said record.

2. A pregrooved magnetic record according to claim 1 in which the surface of said record below said track and said walls is substantially an allochiral enantiomorphic image of its opposite surface thereby further increasing the flexibility of said elemental areas and thus further improving the capacity of said elemental areas to float and move and adjust themselves against said working tip of said electromagnetic transducer.

3. A pregrooved magnetic record according to claim 1 in which the surface of said record below said track said walls and said recess groove is substantially an allochiral enantiomorphic image of its opposite surface thereby the thickness of said record in the vicinity of said recess groove is smaller than in other parts of the pregrooved portion area of said record, thereby even further increasing the flexibility of said elemental areas and thus even further improving the capacity of said elemental areas to float and move and adjust themselves against said working tip of said electromagnetic transducer.

4. A magnetic record formed with raised wall portions spaced-apart to define between each pair of them a magnetic track, along which track the shoe of an electromagnetic transducer may ride while it is guided by said raised wall portions, there being a recessed groove between each of the two edges of said track and the adjoining wall portions.

5. A pregrooved magnetic track on a magnetic record, said track formed with spaced-apart raised walls defining between each pair of them the surface area of said magnetic track, and there being a longitudinal recessed groove, in the form of a gutter, at the merging area between said surface area and each of its two adjoining walls, this arrangement permitting improved seating of the pole shoe of an electromagnetic transducer when it rides along said track of said record.

* * * * *